United States Patent [19]

Goedicke et al.

[11] Patent Number: 6,019,876
[45] Date of Patent: Feb. 1, 2000

[54] PULSED DC SPUTTERING METHOD OF THIN FILM MAGNETIC DISKS

[75] Inventors: Klaus Goedicke; Michael Junghähnel, both of Dresden; Torsten Winkler, Radeberg; Artur Lang, Worms; Dieter Meyer, Bad Nauheim; Manfred Müller, Essenheim; Hans-Herrmann Schneider, Heidesheim; Rainer C. Schneider, Bischofsheim, all of Germany

[73] Assignee: International Business Machines Corporation, Armonk, N.Y.

[21] Appl. No.: 09/080,088

[22] Filed: May 15, 1998

[30] Foreign Application Priority Data

May 15, 1997 [DE] Germany ............... 197 20 251

[51] Int. Cl.$^7$ ............................................. C23C 14/32
[52] U.S. Cl. ....................... 204/192.2; 204/192.12; 204/192.15
[58] Field of Search .................. 204/192.12, 192.15, 204/192.13, 192.2, 192.1, 298.03, 298.08

[56] References Cited

U.S. PATENT DOCUMENTS

| | | | |
|---|---|---|---|
| 4,956,070 | 9/1990 | Nakada et al. | 204/298.08 |
| 5,084,152 | 1/1992 | Lin | 204/192.15 |
| 5,300,205 | 4/1994 | Fritsche | 204/192.12 |
| 5,303,139 | 4/1994 | Mark | 204/298.08 |
| 5,492,745 | 2/1996 | Yokoyama | 204/192.15 |
| 5,507,930 | 4/1996 | Yamashita et al. | 204/192.15 |
| 5,693,198 | 12/1997 | Lal et al. | 204/192.15 |
| 5,762,766 | 6/1998 | Kurita et al. | 204/192.13 |

OTHER PUBLICATIONS

N. Tani et al., "Increase of Coercive Force in Sputtered Hard Disk", IEEE Trans. on Magnetics, vol. 26, No. 4, Jul. 1990, pp. 1282–1285.

S. Schulz et al., "A New Single Disk Coating System for Magnetic Disks", Society of Vacuum Coaters, 35th Annual Technical Conference Proceedings (1992), pp. 382–387.

*Primary Examiner*—Nam Nguyen
*Assistant Examiner*—Gregg Cantelmo
*Attorney, Agent, or Firm*—G. Marlin Knight

[57] ABSTRACT

A method and apparatus for depositing an underlayer and/or a magnetic thin film layer on a data storage disk are described. The sputtering power is supplied in the form of pulses during the application of the underlayer and/or magnetic storage to periodically ignite the plasma and increase the charge-carrier density in the sputtering chamber. The repetition frequency and parameters for the pulses and pauses between pulses are adjusted to achieve a desired nominal value for the coercive field strength of the magnetic layer. Preferably the repetition frequency of the power switching is from 10 to 80 kHz and the ratio of pulse length to pulse pause is within 5:1 to 1:5.

16 Claims, No Drawings

PULSED DC SPUTTERING METHOD OF THIN FILM MAGNETIC DISKS

BACKGROUND OF THE INVENTION

1. Field of the Invention

The invention relates to a method for coating high quality thin film magnetic disks for the magnetic storage of data—known as storage disks—by magnetron sputtering.

2. Description of Related Art

Magnetic storage disks in general have a substrate comprising aluminum alloy or glass. To this substrate, a coating set comprising an underlayer, preferably of chromium or a chromium alloy such as CrV or CrTi, a magnetic storage layer comprising a cobalt alloy, such as, for example, CoCrNi, CoCrTa or CoCrPt, and a thin protective and lubricating layer, generally carbon, are typically applied. Glass substrates are typically coated with an additional thin layer under the underlayer which is called a seed layer. In the following the term substrate will be used to include the optional seed layer if present.

The demand for increase in storage density to values greater than 100 Mbit/inch$^2$ requires the application of magnetic layer sets with a high coercive field strength. For this the layer thickness must not be increased but must, on the contrary, be reduced. Typical values for the coercive field strength have been from 1500 to 2000 Oe. More recent developments for storage disks demand an increase in this value to over 2000 Oe with a high reproducibility of the manufacturing process.

It is known in the prior art that one can apply the requisite layers of the layer set by direct current magnetron sputtering using targets consisting of the alloys to be deposited, e.g. chromium targets can be used to deposit a thin film chromium layer. A target in the terminology used in the sputtering art refers to the replaceable solid elements which are bombarded by the process gas ions to liberate ions which migrate to the substrates. The power source on which the targets are mounted is called the "source." Investigations carried out on methods of improving the layer properties show two approaches in developments to raise the coercive field strengths of sputtered layers for magnetic disks: a) increase of the substrate temperature during coating and b) the use of bias voltage on the substrate in depositing the underlayer and the magnetic layer (cf. Noriaki Tani et al., "Increase of Coercitive Force in Sputtered Hard Disk", IEEE Transactions on Magnetics, Vol. 26, No. 4, July 1990 and S. Schulz et al., "A new single disk coating system for magnetic disks", Society of Vacuum Coaters, 35th Annual Technical Conference Proceedings (1992), pp.382–387).

There are, however, practical limits on the use of these teachings and they have the following disadvantages: the upper limit of the substrate temperature is limited to 200 to 230° C. by the mechanical properties of the substrate material and the substrate mount. Even when glass substrates are used these limits cannot be greatly exceeded. In the case of moving substrates the application of a bias voltage creates technical problems. In the transition to glass substrates the use of direct current biasing is essentially not possible. Thus, a bias voltage is rarely used. Accordingly, the potential of the layer materials can thus not be fully exploited in accordance with the state of the art.

SUMMARY OF THE INVENTION

It is an object of the invention to improve the method for the application of the underlayer and the magnetic layer on storage disks by magnetron sputtering to achieve a higher coercive field strength and storage density at a given layer thickness and with high reproducibility. It is an object of the invention that it should be capable of being implemented with the simplest possible means and with only slightly modified conventional coating equipment.

It was found that by introducing the energy in the form of pulses into the plasma of a magnetron coating device it is possible to achieve a notable improvement in the structure of the underlayer and/or the magnetic storage layer of the layer set and a corresponding improvement in the coercive strength at given layer thicknesses. The parameters of the pulsed energy can surprisingly influence the magnetic characteristics. Such parameters are the length of the pulse, the length of the pause between two pulses and their ratio to one another.

DETAILED DESCRIPTION OF THE PREFERRED EMBODIMENT

The input of energy in the form of pulses in magnetron sputtering has hitherto been employed in a completely different application of sputtering. Essentially the pulsed input of energy has been used in magnetron sputtering for the reactive separation of electrically poorly conducting layers from chemical compounds. An example of pulsed power in reactive sputtering is found in co-pending, commonly assigned U.S. patent application bearing Ser. No. 08/989,246 which is hereby incorporated by reference. In such processes the tendency of the magnetron discharge to change into an arc discharge can be effectively reduced by introducing the energy in pulsed form. However, this does not occur when sputtering the aforesaid underlayers and magnetic storage layers for storage disks. Consequently, there has been no motivation to supply of energy in the form of pulses in sputtering highly conductive metallic layers in general and specifically for storage disks. Obviously the improved structure of the underlayer and of the magnetic storage layer of storage disks through the process in accordance with the invention results from the periodic strong increase of the charge-carrier density during the sputtering process and from the periodic plasma ignitions.

The effects of the increased charge-carrier density and the density of the excited state of sputtered particles is not separately recognizable, which is proof for the expert that this process in accordance with the invention brings about effects which were not to be expected. It must, however, be assumed, that the structure of the sputtered layers is improved and an increased segregation of chromium in the magnetic layer achieved. In this way, effects are achieved which appear also to be broadly obtainable through high substrate temperatures or the application of a high bias voltage to the substrate. However, the effects obtained by application of the process in accordance with the invention greatly exceed the effects of substrate temperature and biasing of the substrate known in the art.

It is particularly advantageous that the target value for the coercive field strength which can be derived from the product requirements for the storage disk can be adjusted by electrical means alone, i.e., by selection of the pulse parameters for the energy input. The higher the target value for the coercive field strength, the lower is set the ratio between the pulse length and the pulse separation. A frequency of 50 kHz has been found to be particularly advantageous. Obviously the numerous instances of ignition and quenching of the plasma have a favorable influence on a high yield of ions and excited sputtered particles.

One important advantage of the process in accordance with the invention resides in the fact that it can be employed widely with the known magnetron sputtering systems already in use for the coating of storage disks.

Despite the very high plasma density existing during the pulses, there is no significant change in the average power density in the magnetron source because of the pauses between the pulses. Also the average value of the thermal load on the substrate is not increased by more than 20%. In order to carry out the process it is only necessary to have suitable special switching devices for pulsed energy in the magnetron source.

It is particularly advantageous if the process is carried out without biasing of the substrate. No technical expenditure is then required for contacting or holding the substrate and the process can be carried out on insulated substrates, e.g., on glass plates. If extremely high values for the coercive field strength are achieved, which exceed the usual value by a wide margin, it may also be desirable to combine pulsed energy input into the plasma and the use of a bias on conductive substrates.

Particularly high values for the reproducibility of the magnetic properties at high values of coercive field strength are achieved with the process in accordance with the invention by setting the substrate temperature to at least 200° C. and selecting a pressure of 0.8 Pa during magnetron sputtering.

The invention will be further illustrated by reference to an specific example which is not intended to imply limits of the invention. A multi-chamber continuous sputtering system can serve for the production of the complete layer set, consisting of underlayer, magnetic storage layer and overcoat layer for storage disks. The substrates are 95 mm disks of an aluminum-magnesium alloy, coated with a nickel phosphorus layer. In this example the material for the underlayer is chromium and the material for the magnetic storage layer is a three-component cobalt alloy. An amorphous carbon layer serves as the overcoat layer. All layers applied in the continuous sputtering system are deposited using direct current magnetron sputtering. For this, groups of about 50 substrates are fixed in a holder and fed through the system for coating. The substrates in their holder are carried in a line past the magnetron source during the coating. Before coating, the substrates are heated to a temperature of 210° C. ñ 10 degC. During sputtering, the pressure of the argon process gas is 0.8 Pa.

If the magnetron sources are supplied with direct current, characteristic magnetic properties of the storage disks are achieved at optimal deposition parameters in accordance with the Table, line 1. The coercive field strength is 2300 Oe ñ4%.

In accordance with the objectives of the patent, storage disks with a higher storage density and with coercive field strengths about 20% higher are produced. In accordance with the invention the chromium layer is applied using a pulsed energy supply to the magnetron source which hold the chromium targets for the sputtering of the underlayer. Using one switching device for each magnetron source the energy supply is pulsed at a frequency of 50 kHz. After each 15 µs pulse there is a 5 µs pause, so that the ratio of pulse length to pulse pause is 3:1. The average of the power supplied to the magnetron source corresponds to that used in sputtering the layer in direct current operation. The layer thickness obtained using pulsed sputtering is some 10% lower than that obtained with direct current sputtering. The properties of the resultant magnetic layer are shown in the table, line 2. Thus, the coercive field strength has increased to 2680 Oe ñ3%, i.e., it is 16.5% greater than in the case of direct current sputtering. A further embodiment of the process consists of supplying the energy to the plasma in pulsed form in applying both the underlayer and the magnetic storage layer. The pulse parameters for the application of the base layer of Cr are the same as in the variant of the process described above. Application of the magnetic storage layer is carried out by delivering the energy at a pulse repetition frequency of 50 kHz with a pulse length to pulse pause ratio of 1:1, i.e., a pulse duration of 10 µs followed by a pause of 10 µs. Line 3 of the table shows the magnetic parameters of the layers applied in accordance with this embodiment. The coercive field strength amounts to 2880 Oe ñ3%, namely 25% greater compared with direct current sputtering.

The table also gives the Mrt value as a further important parameter. This is the value for the magnetic remanence layer thickness. This value characterizes the area necessary for information storage. Comparison of the Mrt values in the different lines of the table shows that this quality parameter of the storage disks is also markedly improved by the use of the process in accordance with the invention.

| | Underlayer | | | Storage layer | | | Properties | |
|---|---|---|---|---|---|---|---|---|
| Process | Type of opera- tion | f [kHz] | Pulse ratio | Type of opera- tion | f [kHz] | Pulse ratio | $H_c$ [Oe] | Mrt |
| Standard | DC | — | — | DC | — | — | 2300 | 0.75 |
| Embodi- ment 1 | Pulse | 50 | 3:1 | DC | — | — | 2600 | 0.55 |
| Embodi- ment 2 | Pulse | 50 | 3:1 | Pulse | 50 | 1:1 | 2880 | 0.48 |

The following preferred parameter ranges are given for use in accordance with the teachings of the invention. The repetition frequency of the pulses can be 10 to 80 kHz and at a given layer thickness the ratio of the pulse length to pulse pause is set according to the desired nominal value of the coercive field strength. Preferably, the ratio of pulse length to pulse pause is set within the range 5:1 and 1:5; the substrate temperature during the application of the underlayer and/or the magnetic storage layer can be set to 200 to 230° C.; the pressure in applying the underlayer and/or the magnetic storage layer can be set to 0.5 Pa to 2 Pa, more preferably 0.8 Pa; during the application of the underlayer and/or the magnetic storage layer a direct current bias voltage of −50 V to −400 V, more preferably −250V can optionally be applied to the substrate.

We claim:

1. A method of depositing thin film layers on storage disks comprising the steps of:

sputtering an underlayer onto each substrate while periodically by pulsing power to an underlayer sputtering target during sputtering of the underlayer onto each substrate so that pulses power are separated by pauses; and sputtering a magnetic layer onto the underlayer.

2. The method of claim 1 wherein the step of sputtering a magnetic layer further comprises the step of pulsing power to a magnetic layer sputtering target during sputtering of the magnetic layer on each substrate so that pulses of power to the magnetic layer sputtering target are separated by pauses.

3. The method of claim 2 wherein the step of sputtering a magnetic layer further comprises periodically igniting and quenching a plasma.

4. The method of claim 1 wherein the step of sputtering an underlayer further comprises the step of periodically pulsing power to a sputtering target at a selected repetition frequency.

5. The method of claim 4 wherein the repetition frequency of pulses is from 10 to 80 kHz.

6. The method of claim 4 further comprising the step of selecting a ratio of pulse length to pulse pause to produce a selected nominal value of coercive field strength for the storage disk using a lower ratio between pulse length and pulse separation for higher coercive field strength.

7. The method of claim 4 wherein a ratio of pulse length to pulse pause is within 5:1 to 1:5.

8. The method of claim 4 further comprising the steps of: heating the substrate before sputtering the underlayer to between 200 to 230° C.; and setting a pressure of a process gas from 0.5 Pa to 2 Pa.

9. The method of claim 1 further comprising the step of applying a direct current bias voltage of −50 V to −400 V to the substrate during application of the underlayer.

10. A method of depositing thin film layers on a storage disk comprising the steps of:

sputtering an underlayer onto a substrate while periodically pulsing power to a sputtering target in a magnetron sputtering chamber in which the substrate is located; and sputtering a magnetic layer onto the underlayer.

11. The method of claim 10 the step of sputtering an underlayer further comprising repeatedly switching DC power to the sputtering target on to produce a pulse followed by switching the DC power off to produce a pause.

12. The method of claim 11 wherein a repetition frequency of the pulses is from 10 to 80 kHz.

13. The method of claim 12 wherein a ratio of pulse length to pulse pause is within 5:1 to 1:5.

14. The method of claim 13 further comprising the steps of: heating the substrate before sputtering the underlayer to 200 to 230° C.; and setting a pressure of a process gas from 0.5 Pa to 2 Pa.

15. The method of claim 13 further comprising the step of applying a direct current bias voltage of −50 V to −400 V to the substrate during application of the underlayer.

16. The method of claim 13 wherein the step of sputtering a magnetic layer further comprises the step of periodically igniting a plasma.

* * * * *